July 19, 1966
M. ALTHUSER
3,261,149
FILTER MEANS FOR USE IN MEASURING
THE RADIO-ACTIVITY OF AEROSOLS
Filed Sept. 10, 1962
FIG.-1
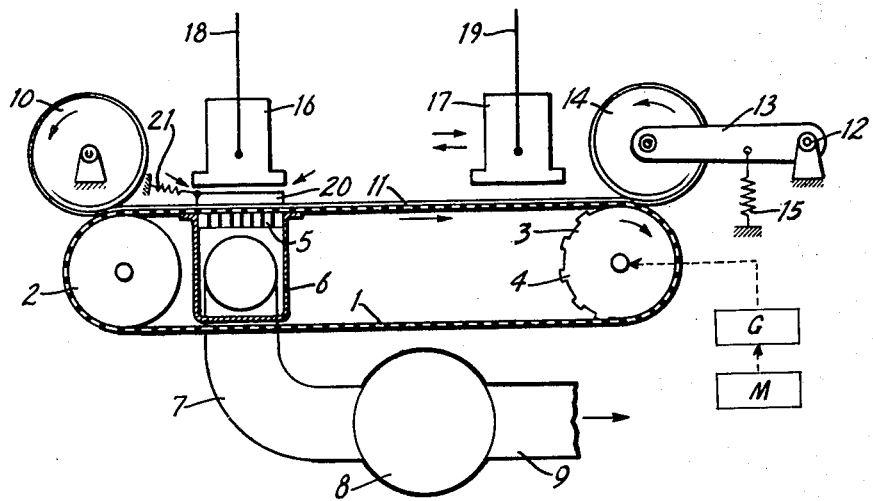
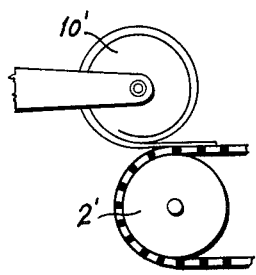
FIG.-2
INVENTOR
MEINRAD ALTHUSER
BY
MORGAN, FINNEGAN, DURHAM & PINE
ATTORNEYS

United States Patent Office 3,261,149
Patented July 19, 1966

3,261,149
FILTER MEANS FOR USE IN MEASURING THE RADIO-ACTIVITY OF AEROSOLS
Meinrad Althuser, Zug, Switzerland, assignor to Landis & Gyr, A.G., Zug, Switzerland, a body corporate of Switzerland
Filed Sept. 10, 1962, Ser. No. 222,341
2 Claims. (Cl. 55—354)

This invention relates to the measurement of radio-activity and more particularly to the measurement of the radio-activity of aerosols.

In air-monitoring plants for measuring the radio-activity of aerosols, in order to obtain the necessary degree of sensitivity, comparatively large quantities of the medium to be examined, for example air, are drawn through a filter material, the aerosol being left on the filter in concentrated form, whereupon it can be measured for radio-activity using conventional means.

Such plants are preferably constructed so that the collecting process is continuous. This can be done by drawing a filter in strip form at a uniform speed across the inlet of an air suction pump.

The air drawn through the filter, however, presses the filter strip against the suction orifice, so that a relatively strong pull has to be exerted in order to keep it moving. With such an arrangement, therefore, one can only use a filter material capable of sustaining quite a large tensile stress.

On the other hand, to be effective the filter material must fulfill requirements relating to its collecting ability. e.g., low density, small depth of penetration, resistance to high temperatures, etc. These factors point to filter material having comparatively little mechanical tensile strength. The art has accordingly devised filter-strip conveying means which attempt to eliminate any mechanical stressing of the filter strip.

One attempt at achieving this result involves a known apparatus in which the filter strip is moved by a perforated cylinder which is driven at a constant speed and which is mounted for rotation over the inlet orifice of a suction pipe, the filter strip being wrapped far enough round the perforated cylinder casing to completely cover the orifice. The take-up roller for the filter strip is driven through a slipping clutch. With this apparatus the filter strip is virtually relieved of any mechanical tensile stress at the suction station since it moves there together with the support, but there nevertheless remains undesirable tension in the filter material extending between the perforated cylinder and the take-up roller.

A further disadvantage of such a construction is the fact that the action of the arrangement at the suction station can be ascertained only with difficulty. In many measuring jobs several measuring monitors are required to scan the used filter strip, one of these being mounted directly above the suction inlet while the others are located between the suction inlet and the take-up roller. A serious disadvantage of the known arrangement is that analysis and comparison of the measured values obtained is made quite difficult by the different geometry of the various measuring stations.

It is thus among the objects of the present invention to provide filter-strip conveying means for use in measuring the radio-activity of large volume aerosols, wherein the above disadvantages are eliminated or greatly reduced.

These and other objects and advantages of the invention will be set forth in part hereinafter, and in part will be obvious herefrom, or may be learned by practice with the invention, the same being realized and attained by means of the combinations and instrumentalities pointed out in the appended claims.

The invention consists in the novel parts, constructions, arrangements, combinations and improvements herein shown and described.

The accompanying drawing shows in FIGURE 1 a diagrammatic example of an illustrative embodiment of the invention and a modification thereof in FIGURE 2.

In the drawing there is illustrated an endless, flexible and perforated conveyor belt 1 which is mounted on two guide drums 2 and 3. One of theses drums, for example drum 3, is driven, through a gear G by a motor M, in such a way that the filter strip, hereinafter described, is advanced in the illustrated direction at a constant speed. In order to provide a positive drive for the belt, guide drum 3 preferably has teeth 4 which engage the perforations in the conveyor belt 1.

Mounted near the guide drum 2 is a suction vessel 6 which has a suction orifice 5 and is connected through a pipe 7 to a suction pump 8. Thus the air to be tested is drawn in through the perforated conveyor belt 1 and the suction orifice 5 and then exhausted into the open air through a pipe 9.

Above the guide roll 2, a filter-strip supply roll 10 is mounted for rotation about a stationary axis. The filter strip 11 runs down in front of the supply roll 10 and rests on top of the perforated conveyor belt 1 between the two guide drums 2, 3. Arranged above the conveyor drum 3 is a take-up roll 14, which is mounted for rotation at the free end of a lever 13, the lever being pivotable about a bearing 12. The roll 14 is held pressed against the perforated conveyor belt 1 by its own weight and by a tension spring 15, so that it is driven by the belt.

It is apparent that this arrangement enables the take-up roll 14, quite independently of the amount of filter strip already wound around it, to assume at all times a rotary speed which completely prevents the filter strip 11 from being loaded in tension.

It is also possible to mount the supply roll 10 in the same way as the take-up roll 14 as shown in FIGURE 2.

A radiation detector 16 is mounted directly above the suction orifice 5 at a given spacing above the filter strip 11 and is designed to match the shape of the suction orifice 5. A second, similarly designed radiation detector 17 is arranged at a specific distance from the detector 16 between the latter and the take-up roll 14. The detector 17 is preferably mounted so that, while maintaining its spacing from the filter strip 11, it can be moved longitudinally thereof and fixed in the new position. Electric supply leads to the two radiation detectors are indicated at 18 and 19.

Instead of employing only one additional radiation detector 17, several of these may be provided. The important aspect lies in keeping the same geometrical conditions with respect to all the detectors used.

As a result of the pressure drop occurring over the filter aperture 5 during the suction process, the filter strip 11 is constantly kept pressed against the perforated conveyor belt 1, thus ensuring that the filter strip is conveyed satisfactorily, and particularly without slipping.

It is nevertheless possible for leakage losses to occur both between the filter strip 11 and the perforated conveyor belt 1 and between the latter and the suction orifice 5, which leakage would make the measuring results unsatisfactory. Accordingly, a thin, movably mounted pressure frame 20 is provided in the gap between the radiation detector 16 and the filter strip 11, its shape matching that of the suction orifice 5 and its function being to keep both the filter strip 11 and the perforated conveyor belt 1 lightly pressed against the suction orifice 5.

In order to avoid friction losses as far as possible and to prevent any damage to the filter strip 11, the pressure frame 20 is mounted for displacement longitudinally of the filter strip 11, so that it can be displaced intermittently together with the filter strip and the perforated conveyor belt. By means of a raising and guiding means (not shown) the pressure frame 20 is lifted from the filter strip 11, after moving with it for a predetermined distance, and is then returned to its starting position by the flyback action of a tension spring 21, whereupon the same cycle is repeated for as long as the conveyor belt 1 is driven. It is desirable that parameters be chosen such that the periodic displacement of the pressure frame is only a small fraction of the width of the suction orifice 5.

The pressure frame 20 can also be lifted from the filter strip 11 by the application of a force after being carried along a short distance by it, returned to its starting position, and then released again.

In addition, the means 20 may comprise both a frame and connected thereto, a suction tube leading out of the apparatus. This substantially prevents the air sucked in from causing soiling and possibly contamination of the whole apparatus.

In operation, conveyor belt 1 is driven by the motor M via gear G and driving drum 3. As a consequence filter strip 11 is transported from supply roll 10 to take-up roll 14 whereby it moves past the suction orifice 5. The radiation levels are measured by detectors 16 and 17, as the medium is drawn through the filter strip, belt, orifice and pipe 7 under the action of suction pump 8.

The invention in its broader aspects is not limited to the specific mechanisms shown and described, but departures may be made therefrom within the scope of the accompanying claims without sacrificing the principles and advantages thereof.

What is claimed is:

1. For use in measuring the radioactivity of aerosols, the combination of
    means for providing a suction orifice through which aerosols to be tested can pass;
    a perforated conveyer;
    means driving said conveyer across said orifice in continuous fashion;
    a supply roll of fragile filter strip material;
    a take up roll;
    said fragile filter-strip conveyed from said supply roll to said take-up roll across said orifice by said conveyer;
    means for mounting each of said rolls for free rotation;
    means urging said take-up roll into engagement with said conveyer so that said take-up roll is driven by said conveyer via the portion of said filter-strip wound thereon to thereby maintain the linear speed at the periphery of said take-up roll the same as the linear speed of said conveyer, said filter-strip being supplied, conveyed across said orifice and taken-up without imparting any significant tension thereto.

2. Apparatus in accordance with claim 1 further including means urging said supply roll into engagement with said conveyer so that said supply roll is driven by said conveyer via the portion of said filter-strip wound thereon.

References Cited by the Examiner
UNITED STATES PATENTS

| | | | |
|---|---|---|---|
| 1,959,418 | 5/1934 | Fourness | 242—75.1 X |
| 1,982,507 | 11/1934 | Fite. | |
| 2,441,679 | 5/1948 | Wade | 242—65 X |
| 2,582,429 | 1/1952 | Haswell | 242—65 |
| 2,722,998 | 11/1955 | Hall | 55—353 |
| 2,807,330 | 9/1957 | Rivers | 55—354 |
| 2,881,861 | 4/1959 | Dyer | 55—354 |
| 2,901,626 | 8/1959 | Becker | 55—290 |
| 3,061,225 | 10/1962 | Huck | 242—75.1 |
| 3,092,723 | 6/1963 | Payne et al. | 55—351 X |

References Cited by the Applicant
FOREIGN PATENTS

| | | |
|---|---|---|
| 192,751 | 11/1957 | Austria. |
| 1,234,940 | 5/1960 | France. |
| 1,085,266 | 7/1960 | Germany. |
| 664,846 | 1/1952 | Great Britain. |
| 734,910 | 8/1955 | Great Britain. |
| 883,143 | 7/1960 | Great Britain. |
| 176,067 | 7/1961 | Sweden. |

HARRY B. THORNTON, *Primary Examiner.*